Sept. 3, 1968   KENKICHI TSUKAMOTO   3,399,900

DYNAMIC MECHANISM HAVING A DAMPER

Filed Aug. 24, 1966

United States Patent Office 3,399,900
Patented Sept. 3, 1968

3,399,900
DYNAMIC MECHANISM HAVING A DAMPER
Kenkichi Tsukamoto, 47 Koyama Shimofusa-cho,
Kita-ku, Kyoto-shi, Kyoto-fu, Japan
Filed Aug. 24, 1966, Ser. No. 574,687
Claims priority, application Japan, Aug. 29, 1965,
40/52,431
3 Claims. (Cl. 274—25)

ABSTRACT OF THE DISCLOSURE

A device for the accurate production and transmission of dynamic motion in which the damper is elastically predeformed to produce an internal stress therewithin and a stress due to an external force applied at the time of operation of the damper and the internal stress are caused to substantially nullify each other, non-linear distortion of the damper thereby being reduced to a very low value thus causing the deformation of the damper to be very accurately proportional to the external force applied to the damper.

---

This invention relates to dynamic mechanisms having dampers and more particularly to dampers used in devices which operate in mechanically loaded states.

More specifically, the present invention relates to a new mechanical construction which has been found to be highly effective particularly for devices, such as pickups in acoustical reproduction devices, wherein accurate transmission in correct directions of vibratory motion during operation under a mechanical load is required.

In devices for producing a dynamic motion such as vibration, in general dampers are used in many cases as the pivotal points or for purposes such as reducing mechanical shock or limiting amplitude. Examples of materials used for such dampers are elastic material such as springs and rubber, viscous materials such as greases and oils, and non-elastic materials such as felts and fabrics. The optimum material is selected for each purpose and disposed in the required position.

In order to obtain the accurate motion required by such dynamic motion, however, it is necessary to reduce as much as possible all additional motion other than the required motion. Especially in devices such as pickups wherein the dynamic motion is transduced directly into an electrical characteristic, this additional motion must be reduced to an extremely small magnitude. For this purpose, the selection of material of the damper in each case and the design of construction relating thereto are carried out with great care.

However, the damper also undergoes deformation due to the effect of the dynamic motion, and the stress due to this deformation imparts additional motion to the original dynamic motion. Especially in the case such as that of a pickup where the operation occurs under a mechanical load, a deformation or strain exists in the damper from the very first instant of operation, and the resulting stress imparts additional motion to the required motion, whereby it become impossible to transmit accurately only the desired motion.

Heretofore, with the object of diminishing this spurious motion as much as possible, much effort has been directed toward the devising of improvements in the mechanical structures of the devices other than the damper. However, as a result of experiments, I have found that the damper per se has an extremely great effect on the dynamics of the device.

It is an object of the present invention to eliminate the strain existing in the damper and the stress due to the strain thereby reducing to an extreme extent the aforementioned spurious motion.

More specifically, an object of the invention is to provide a simple construction and mounting arrangement for dampers which are highly effective for devices requiring accurate motion and means for transmitting this motion.

Another object of the invention is to provide an acoustic pickup having a damper of the above stated construction and arrangement whereby clear and pleasant sounds can be faithfully reproduced with good stereophonic separation.

Still another object of the invention is to provide an acoustic pickup having vertical and horizontal acoustic compliances of magnitudes of the same order close to the ideal relationship thereof.

According to the present invention, briefly stated, there is provided in a device for accurate production and transmission of dynamic motion, the construction and arrangement of a damper whereby the damper is elastically predeformed beforehand to produce an internal stress therewithin, and a stress due to an external force applied at the time of operation to the damper and the internal stress are caused substantially to nullify each other, non-linear distortion of the damper thereby being reduced to a very low value thus causing the deformation of the damper to be very accurately proportional to the external force applied to the damper.

According to the present invention there is further provided an acoustic pickup having a damper of the above stated construction and arrangement.

The nature, principle, and details of the invention will be more clearly apparent from the following detailed description with respect to the case of moving-coil type pickups herein selecetd as an example for the purposes of disclosure, when read in conjunction with the accompanying drawing, in which like parts are designated by like reference numerals and characters.

As conducive ot a full understanding of the nature and utility of the present invention, the following consideration of a moving-coil pickup of known design for stereophonic reproducing devices is first presented for comparative purposes.

Figure 1:
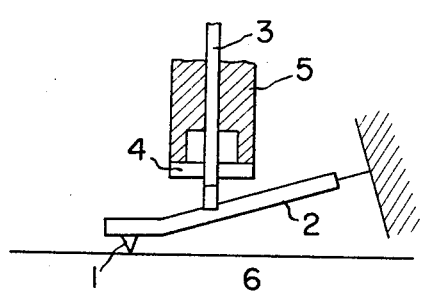
FIGS. 1 and 2 are a side view and an enlarged front view, partly in elevation and partly in cross-section respectively, both in simplified diagrammatic form, showing the essential damper and vibratory parts of a known pickup.
Figure 2:
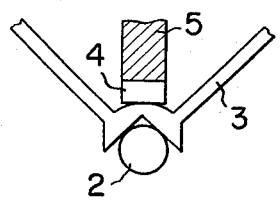

Referring to FIGS. 1 and 2, the pickup of known type illustrated therein is provided with a cantilever bar 2 which is caused to undergo vertical and horizontal vibration by the movements of a needle 1 fixed at the outer end thereof as the needle 1 traces the sound groove of a recording disk 6. This vibration is transmitted to a vibration transmitting member 3 having two side arms and contacting and interposed between the bar 2 and a damper 4 (made of a material such as silicone rubber, in general) fixed to the lower end of support member 5. As a result, two moving coils (not shown) fixed to the upper ends of the arms of the vibration transmitting member 3 are caused to vibrate in respective magnetic fields, whereby electromotive forces are induced in the coils.

Figure 3:
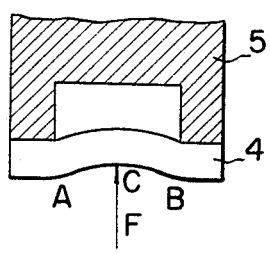
FIG. 3 is an enlarged view partly in elevation and partly in cross-section indicating the deformed state of a known pickup damper at the time of use.

It should be observed, however, that the true state of the mechanism in use is not indicated in FIGS. 1 and 2. In actual use, since the pickup is placed on the recording disk, an upward reaction load is applied to the needle 1 shown in FIG. 1. That is, during operation, the damper 4 is used in a continually deformed state as indicated in FIG. 3, and in which state the damper is being deflected by a force F due to the needle pressure.

A stress is thereby caused by this deformation to exist within the damper 4, and strain energy is stored. It has been found that this stress, very inconveniently, is of maximum value at a point C where the vibration transmitting member 3 is situated. The magnitude of this deformation is much greater than that of the deformation of the damper due to vibration during operation.

When reproduction of sound from a record is carried out with the damper in this state, motion caused by the returning force (or reaction) due to this internal stress of the damper is constantly added to the normal motion (e.g., the mutually crossing vertical and horizontal vibrations in the case of a stereophonic player). As a result, faithful reproduction of recorded sounds cannot be accomplished, and in actual test reproductions under these conditions, clear and pleasant sounds cannot be reproduced.

Furthermore, because the damper is made of rubber or like material, the returning force (or reaction) cannot be relied upon under vibratory conditions to be always directed in the same direction, whereby the left and right separation in the reproduction of three-dimensional (stereophonic) sound is impaired. That is, as considered in terms of characteristics, crosstalk is increased. Moreover, since this returning force due to the deflection of the damper operates downwardly, downward motions can readily take place, while upward motions cannot be easily obtained. Consequently, a wide disparity occurs between the upward and downward acoustic compliances.

In addition, since the vertical and horizontal motions occur in an extremely complicated manner, there is ample justification for considering that this added force due to the damper exerts a detrimental influence of complicated nature which cannot be easily analyzed.

These difficulties have heretofore existed to varying degrees because of the use of a damper and have been considered to be unavoidable beyond a certain extent. However, I have found that it is possible to eliminate almost completely the added force from the damper during operation in accordance with the present invention as described hereinbelow.

In accordance with the present invention, a strain or deformation within the elastic limit is imparted beforehand to the damper (that is, the damper is prestrained), and the returning force (or reaction) due to this deformation and the force due to the mechanical load are caused to nullify each other.

Figure 4:
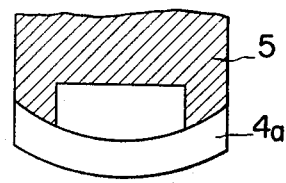
FIG. 4 is a similar view partly in elevation and partly in cross-section showing an example of preferred embodiment of the invention wherein strain has been imparted beforehand to the damper.
Figure 5:
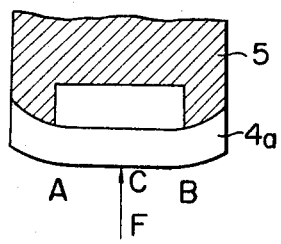
FIG. 5 is another similar view partly in elevation and partly in cross-section indicating the state of the damper shown in FIG. 4 at the time of use.

In a preferred embodiment of the invention as illustrated in FIG. 4, a damper $4_a$ which is in a state of elastic deformation as shown, and which is thereby caused to possess an internal stress, is secured in that state to the support member 5. The damper is thus deflected when it is not in operation. During operation, the damper $4_a$ at its part in the vicinity of the vibration transmitting member (not shown in FIGS. 4 and 5) is caused by the needle force F to assume a no-load state of almost no deformation as indicated in FIG. 5.

That is, it is possible to design the geometrical construction of the damper in accordance with the magnitude of the needle force F so that, when the needle force F is applied, the preestablished deformation will be corrected, and the internal stress within the damper at the central part C will be almost zero.

By this simple but effective technique, although some strain remains at points A and B, the strain at the time of operation in the damper at its central part C in contact with the vibration transmitting member can be almost completely removed, whereby it is possible to eliminate almost completely the motion due to the additional force of the damper and thereby transmit the vibration of only the needle and the cantilever bar to the vibration transmitting member.

Accordingly, by the present damper construction it is possible to eliminate the adverse effect of the damper which heretofore could not be avoided, and extremely clear and pleasant sounds can be faithfully reproduced with good streophonic separation. Moreover, by this damper construction it has become possible to produce a pickup having vertical and horizontal acoustic compliances of magnitudes of the same order close to the ideal relationship.

While the foregoing description has been presented with respect to only the case of pickup as one illustration, it should be understood, of course, that the present invention is applicable generally to devices and apparatuses in which accurate dynamic motion and transmission thereof are required.

Furthermore, it should be understood that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claims.

What I claim is:

1. In a device for accurate production and transmission of dynamic motion, a damper elastically predeformed beforehand to produce an internal stress therewithin so that a stress due to an external force applied at the time of operation to the damper and said internal stress are caused substantially to nullify each other, with non-linear distortion of the damper thereby being reduced to a very low value thus causing the deformation of the damper to be very accurately proportional to the external force applied to the damper.

2. In a device for accurate production and transmission of dynamic motion, a damper supported in an elastically predeformed state producing an internal stress therewithin of a magnitude to be substantially nullified by an external stress applied at the time of operation of the device with non-linear distortion of the damper thereby being reduced to a very low value thus causing the deformation of the damper to be very accurately proportional to the external force applied to the damper.

3. An acoustic pickup comprising a needle, a mechanism for transmitting vibratory motion of the needle to an electromechanical transducer, and a damper contacting said mechanism and receiving a load due to the reaction force on the needle during operation, said damper being held in an elastically predeformed state producing an internal stress therewithin of a magnitude to be substantially nullified by external stress due to said load, with non-linear distortion of the damper thereby being reduced to a very low value thus causing the deformation of the damper to be very accurately proportional to the external force applied to the damper.

References Cited

UNITED STATES PATENTS

| | | | |
|---|---|---|---|
| 310,823 | 1/1885 | Hillman. | |
| 1,904,408 | 4/1933 | Charlin | 274—37 |
| 2,534,725 | 12/1950 | Miller | 274—37 X |
| 2,965,378 | 12/1960 | Assie | 274—37 |

FOREIGN PATENTS

| | | |
|---|---|---|
| 1,338,473 | 8/1963 | France. |

HARRY N. HAROIAN, *Primary Examiner.*